(12) United States Patent
Komatsu et al.

(10) Patent No.: US 6,862,742 B2
(45) Date of Patent: *Mar. 1, 2005

(54) INFORMATION DISTRIBUTION APPARATUS

(75) Inventors: Koji Komatsu, Osaka (JP); Hiroyuki Asano, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,101

(22) Filed: Aug. 27, 1998

(65) Prior Publication Data

US 2003/0135862 A1 Jul. 17, 2003

(30) Foreign Application Priority Data

Mar. 18, 1998 (JP) .......................................... 10-068843

(51) Int. Cl.$^7$ .............................................. H04N 7/173
(52) U.S. Cl. ....................... 725/117; 725/118; 725/119; 725/93; 725/94; 725/98; 370/235; 370/399; 370/422; 370/465; 370/255; 370/352
(58) Field of Search .............................. 725/98, 93, 118, 725/94, 119, 117, 126, 148; 370/255, 235, 252, 355–356, 395.1, 397, 399, 422, 465

(56) References Cited

U.S. PATENT DOCUMENTS

| | | | |
|---|---|---|---|
| 5,586,264 A | * | 12/1996 | Belknap et al. ............. 725/115 |
| 5,631,903 A | * | 5/1997 | Dianda et al. .............. 370/401 |
| 5,651,005 A | * | 7/1997 | Kwok et al. ................ 370/399 |
| 5,671,217 A | * | 9/1997 | Adams et al. .............. 370/233 |
| 5,757,798 A | * | 5/1998 | Hamaguchi ................. 370/397 |
| 5,787,072 A | * | 7/1998 | Shimojo et al. ............ 370/231 |
| 5,841,468 A | * | 11/1998 | Wright ....................... 370/389 |
| 5,864,537 A | * | 1/1999 | Hijikata et al. ............. 370/235 |
| 5,903,563 A | * | 5/1999 | Rashid et al. .............. 370/394 |
| 5,933,426 A | * | 8/1999 | Motoori ..................... 370/352 |

* cited by examiner

*Primary Examiner*—Chris Grant
*Assistant Examiner*—Jason Salce
(74) *Attorney, Agent, or Firm*—Katten Muchin Zavis Rosenman (57) ABSTRACT

An information distribution apparatus for a CATV system which apparatus is capable of transmitting an identical program directed to a plurality of set-top boxes with the use of a single communication path between a distribution control section and an information distributing section. When distribution of identical information is requested from a plurality of set-top boxes, path identification number decision unit determines an identification number of a single communication path for these set-top boxes. Distribution information transmitting unit transmits the requested distribution information to the information distributing section via the communication path with the thus-determined identification number. In the information distributing section, set-top box identifying unit identifies individual set-top boxes to which the distribution information is to be distributed, based on the identification number of the communication path used for transmission by the distribution information transmitting unit. Distribution information distributing unit distributes the distribution information to each of the identified set-top boxes.

5 Claims, 8 Drawing Sheets

FIG. 1

SEPARATE DISTRIBUTION CORRESPONDENCE LIST

| VPI | PORT NO. | STB NO. |
|---|---|---|
| 67 | 1 | 1 |
| 68 | 1 | 2 |
| 69 | 1 | 3 |
| 70 | 2 | 1 |
| 71 | 2 | 2 |
| 72 | 2 | 3 |
| ⋮ | ⋮ | ⋮ |
| 77 | 4 | 2 |
| 78 | 4 | 3 |
| 79 | 5 | 1 |
| 80 | 5 | 2 |
| ⋮ | ⋮ | ⋮ |
| 256 | 64 | 1 |
| 257 | 64 | 2 |
| 258 | 64 | 3 |

FIG. 2

COMMON DISTRIBUTION CORRESPONDENCE LIST

| VPI | VCI BIT NO. | | | | | | | | STB NO. |
|---|---|---|---|---|---|---|---|---|---|
| | | MSB 16 | 15 | 14 | ... | 4 | 3 | 2 | LSB 1 | |
| 67 | 16 | 15 | 14 | ... | 4 | 3 | 2 | 1 | 1 |
| 68 | 16 | 15 | 14 | ... | 4 | 3 | 2 | 1 | 2 |
| 69 | 16 | 15 | 14 | ... | 4 | 3 | 2 | 1 | 3 |
| 70 | 32 | 31 | 30 | ... | 20 | 19 | 18 | 17 | 1 |
| 71 | 32 | 31 | 30 | ... | 20 | 19 | 18 | 17 | 2 |
| 72 | 32 | 31 | 30 | ... | 20 | 19 | 18 | 17 | 3 |
| 73 | 48 | 47 | 46 | ... | 36 | 35 | 34 | 33 | 1 |
| 74 | 48 | 47 | 46 | ... | 36 | 35 | 34 | 33 | 2 |
| 75 | 48 | 47 | 46 | ... | 36 | 35 | 34 | 33 | 3 |
| 76 | 64 | 63 | 62 | ... | 52 | 51 | 50 | 49 | 1 |
| 77 | 64 | 63 | 62 | ... | 52 | 51 | 50 | 49 | 2 |
| 78 | 64 | 63 | 62 | ... | 52 | 51 | 50 | 49 | 3 |

FIG. 3

COMMON DISTRIBUTION MAP

| VPI | VCI BIT NO. | | | | | | | | STB NO. |
|---|---|---|---|---|---|---|---|---|---|
| | MSB 16 | 15 | 14 | ... | 4 | 3 | 2 | LSB 1 | |
| 67 | 0 | 0 | 0 | ... | 0 | 0 | 0 | 0 | 1 |
| 68 | 0 | 0 | 0 | ... | 1 | 0 | 1 | 0 | 2 |
| 69 | 0 | 0 | 0 | ... | 0 | 0 | 0 | 0 | 3 |
| 70 | 0 | 0 | 0 | ... | 0 | 0 | 0 | 0 | 1 |
| 71 | 0 | 0 | 0 | ... | 0 | 0 | 0 | 0 | 2 |
| 72 | 0 | 0 | 0 | ... | 0 | 0 | 0 | 0 | 3 |
| 73 | 0 | 0 | 0 | ... | 0 | 0 | 0 | 0 | 1 |
| 74 | 0 | 0 | 0 | ... | 0 | 0 | 0 | 0 | 2 |
| 75 | 0 | 1 | 0 | ... | 0 | 1 | 0 | 1 | 3 |
| 76 | 0 | 0 | 0 | ... | 0 | 0 | 0 | 0 | 1 |
| 77 | 0 | 0 | 0 | ... | 0 | 0 | 0 | 0 | 2 |
| 78 | 0 | 0 | 0 | ... | 0 | 0 | 0 | 0 | 3 |

INFORMATION DISTRIBUTION APPARATUS

BACKGROUND OF THE INVENTION (1) Field of the Invention

The present invention relates to an information distribution apparatus, and more particularly, to an information distribution apparatus for a CATV system which is provided with an information distributing section (BAS or Broadband Access Shelf), to which a plurality of set-top boxes (STBs) are connected, and a distribution control section (BTS or Broadband Tributary Shelf) situated between the information distributing section and a head-end section.

(2) Description of the Related Art

Figure 8:
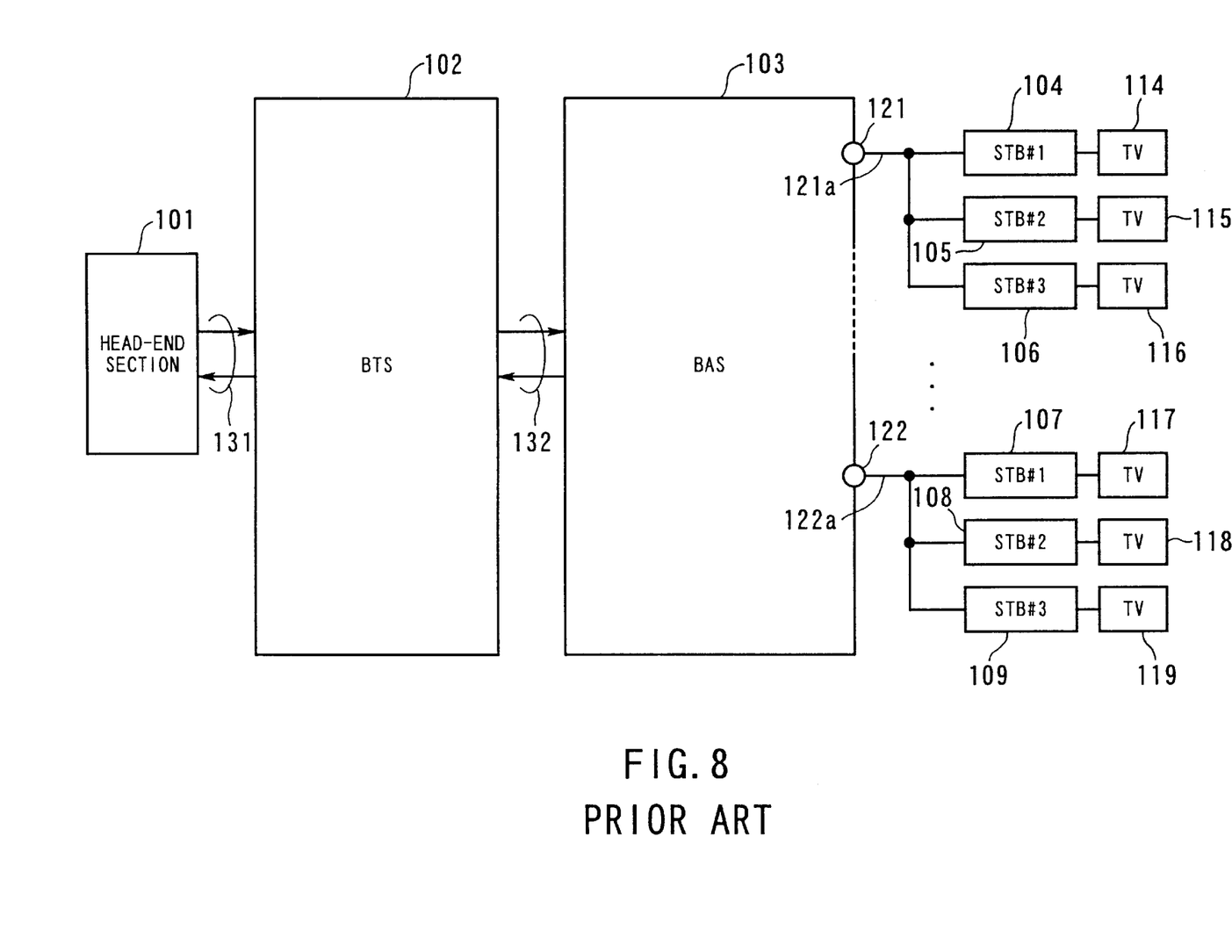
FIG. 8 is a diagram showing an example of a configuration of a conventional CATV system.

FIG. 8 is a diagram illustrating an example of a configuration of a conventional cable television (CATV) system. Specifically, a distribution control section (hereinafter referred to as "BTS") 102 is connected via a bidirectional optical cable 131 to a head-end section 101 which provides a variety of programs, and an information distributing section (hereinafter referred to as "BAS") 103 is connected to the BTS 102 via a bidirectional optical cable 132. The BAS 103 is provided with ports 121, ..., 122 to which set-top boxes (hereinafter referred to as "STBs") 104–106, ..., 107–109 are connected via coaxial cables 121a, ..., 122a. The ports 121, ..., 122 include 64 ports in total, and three STBs are connected to each port and are assigned identification numbers #1 to #3, respectively. Television sets (TVs) 114–116, ..., 117–119, for example, are connected to the STBs 104–106, ..., 107–109, respectively.

In the above configuration, information is transmitted using ATM cells, and each of the STBs makes a request for distribution of a desired program to the BTS 102 via the BAS 103. The BTS 102 selects the requested programs from among various programs transmitted thereto from the head-end section 101, then sets communication paths to the BAS for the respective STBs, and transmits the programs to the BAS. The BAS distributes the programs to the respective STBs.

In the conventional system, however, if both the STB 104 and the STB 107, for example, request the BTS 102 to distribute information on the same channel x, the BTS 102 separately sets communication paths to the BAS 103 for distributing the information on the channel x to the STB 104 and the STB 107, respectively. Namely, the information on the same channel x is transmitted separately between the BTS 102 and the BAS 103.

Moreover, since programs that are distributed by request tend to be limited to particular popular programs, there is a possibility that such unnecessary multiple transmission frequently takes place in large numbers between the BTS 102 and the BAS 103.

To prevent the unnecessary transmission, an identical program may be transmitted from the BTS 102 to the BAS 103 via a single communication path, and in this case, it is necessary that the BTS 102 should notify the BAS 103 of destination STBs to which the program is to be distributed. Notifying destination STBs, however, leads to increase in the traffic between the BTS 102 and the BAS 103, and since popular programs are not necessarily limited to one in number, moreover, destination STBs need to be notified separately for respective popular programs, further increasing the traffic. Also, the BAS 103 is unable to initiate the distribution of a program unless and until the notification of destination STBs is completed, giving rise to a problem that the program distribution is delayed for a time period required for the notification.

SUMMARY OF THE INVENTION

An object of the present invention is to provide an information distribution apparatus which permits an identical program directed to a plurality of STBs to be transmitted using a single communication path between a BTS and a BAS and which also can prevent increase in the traffic between the BTS and the BAS as well as delay in the distribution of programs, which arise in conventional systems.

To achieve the above object, there is provided an information distribution apparatus for a CATV system provided with an information distributing section to which a plurality of set-top boxes are connected, and a distribution control section situated between the information distributing section and a head-end section. The information distribution apparatus comprises path identification number decision unit provided in the distribution control section, for determining an identification number of a single communication path for a plurality of set-top boxes when distribution of identical information is requested from these set-top boxes, distribution information transmitting unit provided in the distribution control section, for transmitting the requested distribution information to the information distributing section via the communication path with the identification number determined by the path identification number decision unit, set-top box identifying unit provided in the information distributing section, for identifying individual set-top boxes to which the distribution information is to be distributed, based on the identification number of the communication path used for transmission by the distribution information transmitting unit when the distribution information is received from the distribution information transmitting unit, and distribution information distributing unit provided in the information distributing section, for distributing the distribution information to each of the set-top boxes identified by the set-top box identifying unit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will be hereinafter described with reference to the drawings.

Figure 1:
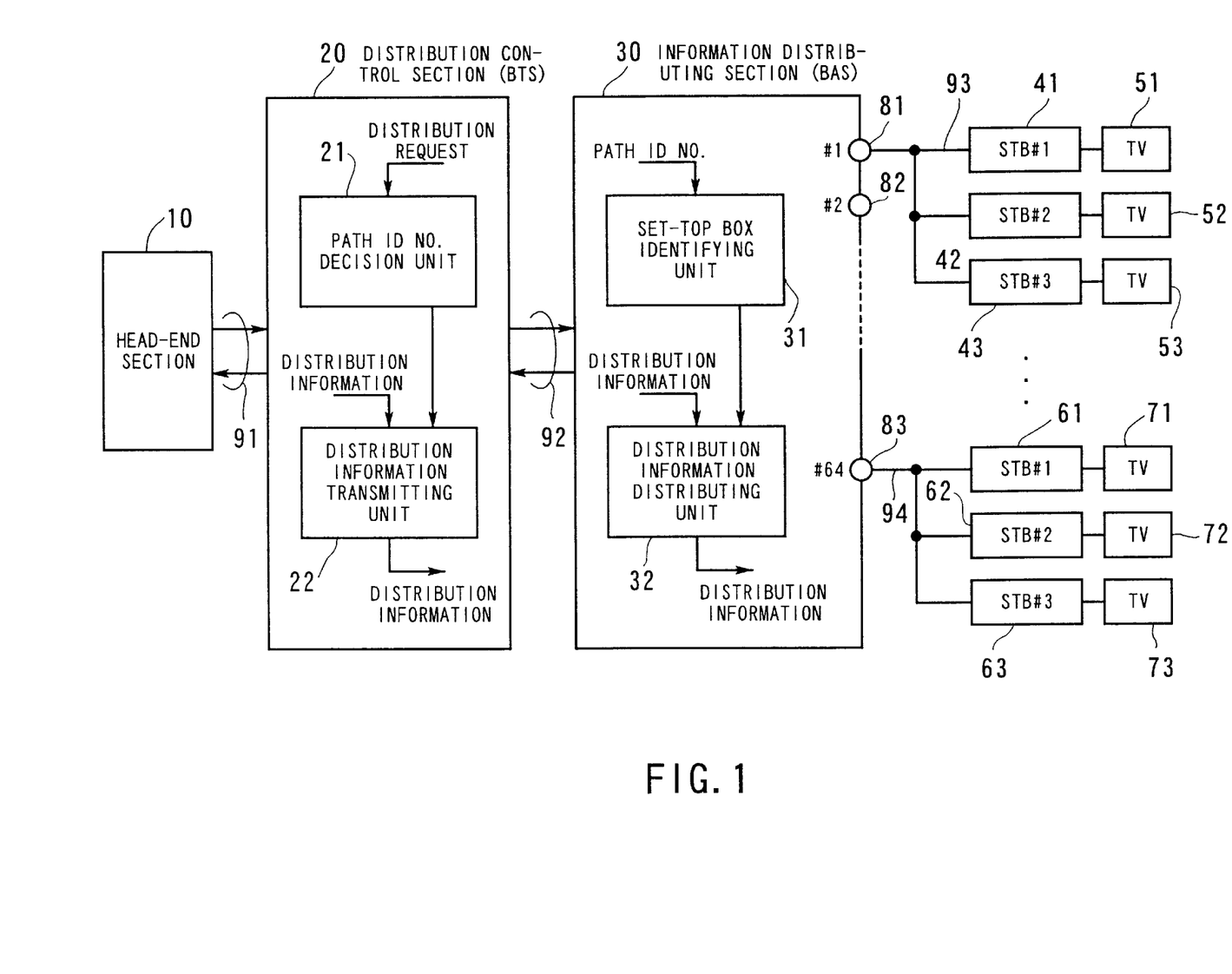
FIG. 1 is a diagram illustrating an entire configuration of a CATV system including an information distribution apparatus according to the present invention.

Referring first to FIG. 1, a theoretical configuration according to the embodiment of the present invention will be explained. The embodiment of the invention comprises path identification number decision unit 21 provided in a distribution control section 20, for determining an identification number of a single communication path for a plurality of set-top boxes when distribution of identical information is requested from these set-top boxes, distribution information transmitting unit 22 provided in the distribution control section 20, for transmitting the requested distribution information to an information distributing section 30 via the communication path with the identification number determined by the path identification number decision unit 21, set-top box identifying unit 31 provided in the information distributing section 30, for identifying individual set-top boxes to which the distribution information is to be distributed, based on the identification number of the communication path used for transmission by the distribution information transmitting unit 22 when the distribution information is received from the distribution information transmitting unit 22, and distribution information distributing unit 32 provided in the information distributing section 30, for distributing the distribution information to each of the set-top boxes identified by the set-top box identifying unit 31.

In the configuration described above, when the distribution control section 20 is requested by a plurality of set-top boxes to distribute identical information, the path identification number decision unit 21 of the distribution control section 20 determines an identification number of a single communication path for these set-top boxes. More specifically, the path identification number decision unit 21 is provided beforehand with a common distribution map having fields corresponding respectively to all set-top boxes 41–43, ..., 61–63 connected to the information distributing section 30, and the value "1" is set in those fields of the common distribution map which correspond to the set-top boxes that requested distribution of the identical information. Then, each field of the common distribution map is related with each digit of a binary number to thereby create an identification number VPI/VCI (Virtual Path Identifier/Virtual Channel Identifier) for the communication path.

The distribution information transmitting unit 22 of the distribution control section 20 transmits the requested information to the information distributing section 30 via the communication path with the identification number determined by the path identification number decision unit 21.

On receiving the distribution information from the distribution information transmitting unit 22, the set-top box identifying unit 31 of the information distributing section 30 identifies the individual set-top boxes to which the distribution information is to be distributed, based on the identification number VPI/VCI of the communication path used for transmission by the distribution information transmitting unit 22. More specifically, the set-top box identifying unit 31 has a correspondence list showing the correspondence between each of all set-top boxes 41–43, 61–63 connected to the information distributing section 30 and a corresponding one of digits acquired when the part VCI of the identification number of the communication path is expressed in binary number. The set-top box identifying unit 31 first expresses, in binary number, the VCI of the communication path used for transmission by the distribution information transmitting unit 22, then extracts the digits with the value "1" in the binary-coded number, and refers to the correspondence list to identify the individual set-top boxes corresponding to the extracted digits.

The distribution information distributing unit 32 of the information distributing section 30 distributes the distribution information to each of the set-top boxes identified by the set-top box identifying unit 31.

Thus, according to the present invention, an identical program directed to a plurality of STBs can be transmitted using a single communication path between the distribution control section 20 and the information distributing section 30. Nevertheless, the distribution control section 20 requires no extra traffic to send the information distributing section 30 information indicative of the set-top boxes to which identical distribution information is to be distributed, and the information distributing section 30 identifies the individual set-top boxes to which the identical distribution information is to be distributed, from the identification number of the communication path via which the identical distribution information has been transmitted. Consequently, the traffic between the distribution control section 20 and the information distributing section 30 does not increase, and also no delay occurs in the program distribution.

The embodiment of the present invention will be now described in more detail.

FIG. 1 is a diagram illustrating the entire configuration of a CATV system including an information distribution apparatus according to the present invention. Specifically, the distribution control section (BTS) 20 is connected via a bidirectional optical cable 91 to a head-end section 10 which provides various programs, and the information distributing section (BAS) 30 is connected to the distribution control section 20 via a bidirectional optical cable 92. The head-end section 10 outputs a variety of MPEG-coded programs. The distribution control section 20 comprises a data processor (not shown) including a CPU, RAM, ROM, I/O, etc., and the path identification number decision unit 21 and the distribution information transmitting unit 22 are functions achieved by the processing operation of the data processor. The information distributing section 30 also comprises a data processor (not shown) including a CPU, RAM, ROM, I/O, etc., and the set-top box identifying unit 31 and the distribution information distributing unit 32 are functions achieved by the processing operation of the data processor.

The information distributing section 30 is provided with ports 81, 82, ..., 83 to which the set-top boxes (hereinafter referred to as "STBs") 41–43, ..., 61–63 are connected via coaxial cables 93, ..., 94. The ports 81, 82, ..., 83 include 64 ports in total, and three STBs are connected to each port. These ports are assigned port numbers #1 to #64, respectively, and the three STBs connected to each port are assigned STB numbers #1 to #3, respectively. Accordingly, the STBs total 192 (=64×3), and each STB can be identified by specifying the port number and the STB number assigned thereto. To the STBs 41–43, 61–63 are connected television sets (TVs) 51–53, ..., 71–73, respectively. Program replay terminals other than television sets are in some cases connected to STBs. Each of the STBs 41–43, ..., 61–63 receives a request for distribution of a desired program from the subscriber and transmits the request to the distribution control section 20; it also decodes MPEG-coded information distributed thereto and sends the decoded information to the corresponding television set.

In the configuration described above, a variety of information such as power-on information, distribution request information and distribution information, described later, is transmitted between the individual devices shown in FIG. 1, and these various kinds of information are conveyed by ATM cells and are transmitted through communication paths set between the individual devices.

The following explains a separate distribution correspondence list, a common distribution correspondence list and a common distribution map which are used in individual processes executed in the distribution control section 20 and the information distributing section 30.

Figure 2:
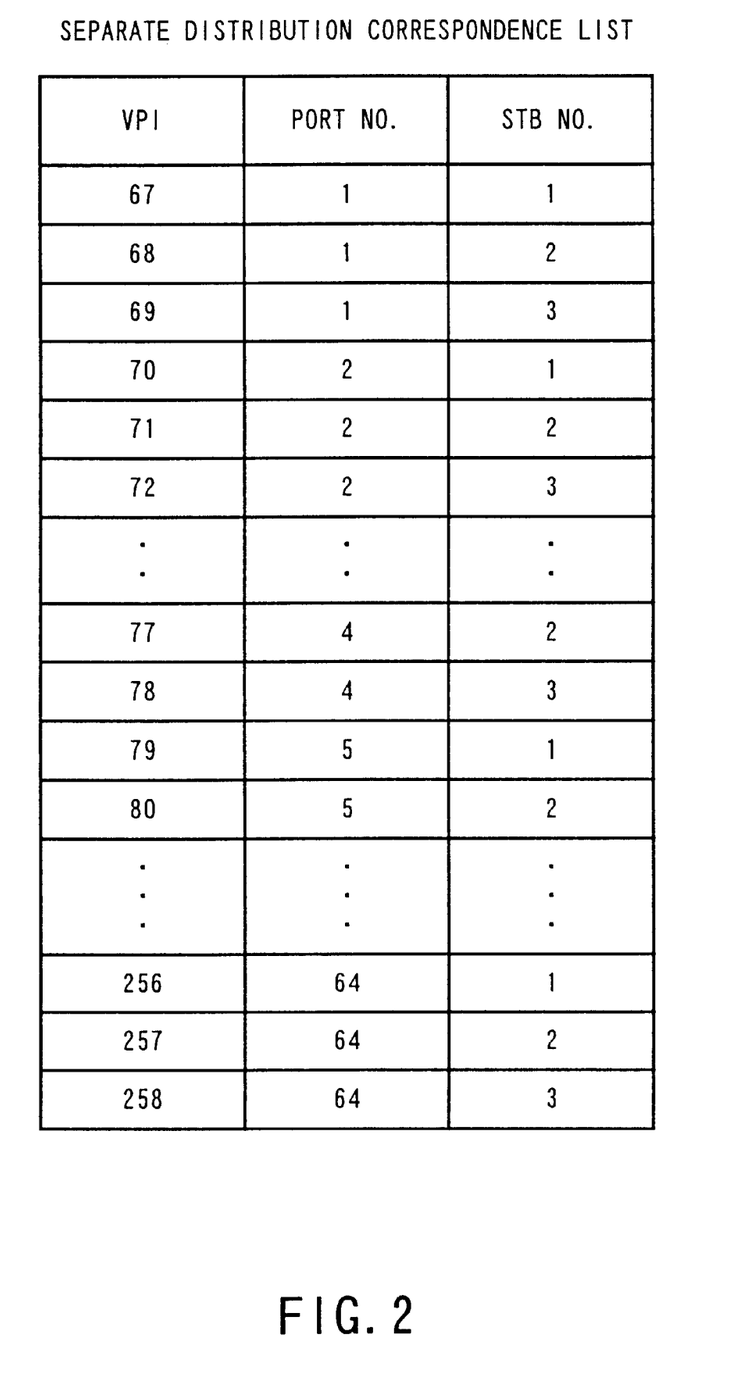
FIG. 2 is a chart showing a separate distribution correspondence list.

FIG. 2 is a chart showing the separate distribution correspondence list. The separate distribution correspondence list is provided in the distribution control section 20 and the information distributing section 30 and is used when the distribution control section 20 transmits cells of distribution information separately to the information distributing section 30.

The separate distribution correspondence list is a list in which the 192 STBs are associated with respective VPI values which are the identification codes of communication paths, and shows the correspondence of the VPIs to the port numbers and STB numbers of the STBS. For example, the VPI value "67" is associated with the STB 41 with the port number #1 and the STB number #1, the VPI value "68" is associated with the STB 42 with the port number #1 and the STB number #2, the VPI value "257" is associated with the STB 62 with the port number #64 and the STB number #2, and the VPI value "258" is associated with the STB 63 with the port number #64 and the STB number #3. The VPI begins with the value "67" because the VPI values "1" to "66" are used for other purposes according to the standards for ATM communication systems.

Figure 3:
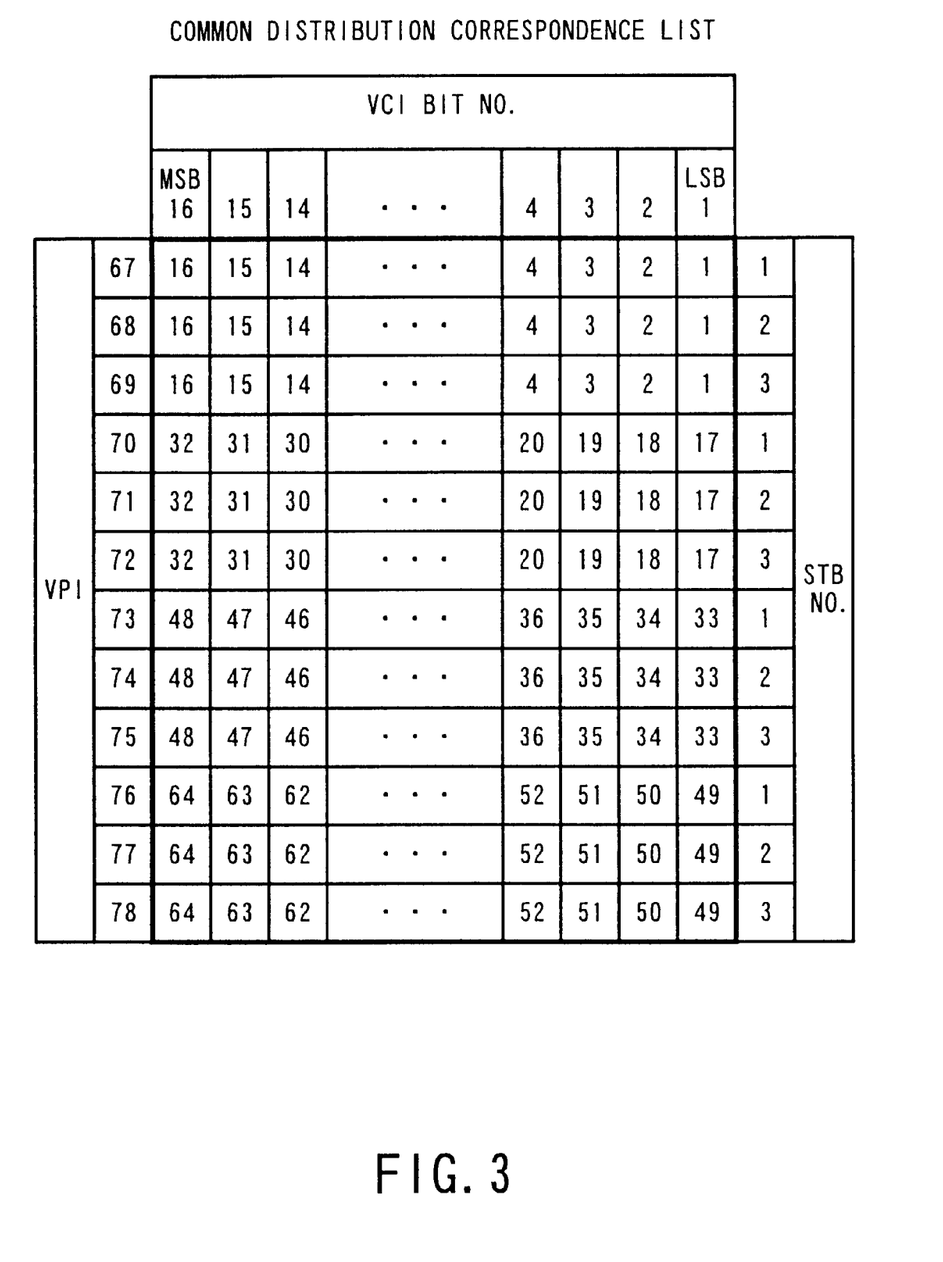
FIG. 3 is a chart showing a common distribution correspondence list.

FIG. 3 is a chart showing the common distribution correspondence list. The common distribution correspondence list is provided in the distribution control section 20 and the information distributing section 30 and is used when the distribution control section 20 transmits common distribution information to the information distributing section 30 by using a single communication path.

The common distribution correspondence list is a list in which the 192 STBs are associated with the VPI values and VCI bit positions (bit numbers), which are the identification codes of the communication paths, and shows the correspondence of the port numbers of the STBs (figures inside the thick-line rectangle) to the VPI values/VCI bit numbers and to the STB numbers. For example, the VPI value/VCI bit number 67/1 corresponds to the STB 41 with the port number #1 and the STB number #1, the VPI value/VCI bit number 68/1 corresponds to the STB 42 with the port number #1 and the STB number #2, the VPI value/VCI bit number 77/16 corresponds to the STB 62 with the port number #64 and the STB number #2, and the VPI value/VCI bit number 78/16 corresponds to the STB 63 with the port number #64 and the STB number #3.

Figure 4:
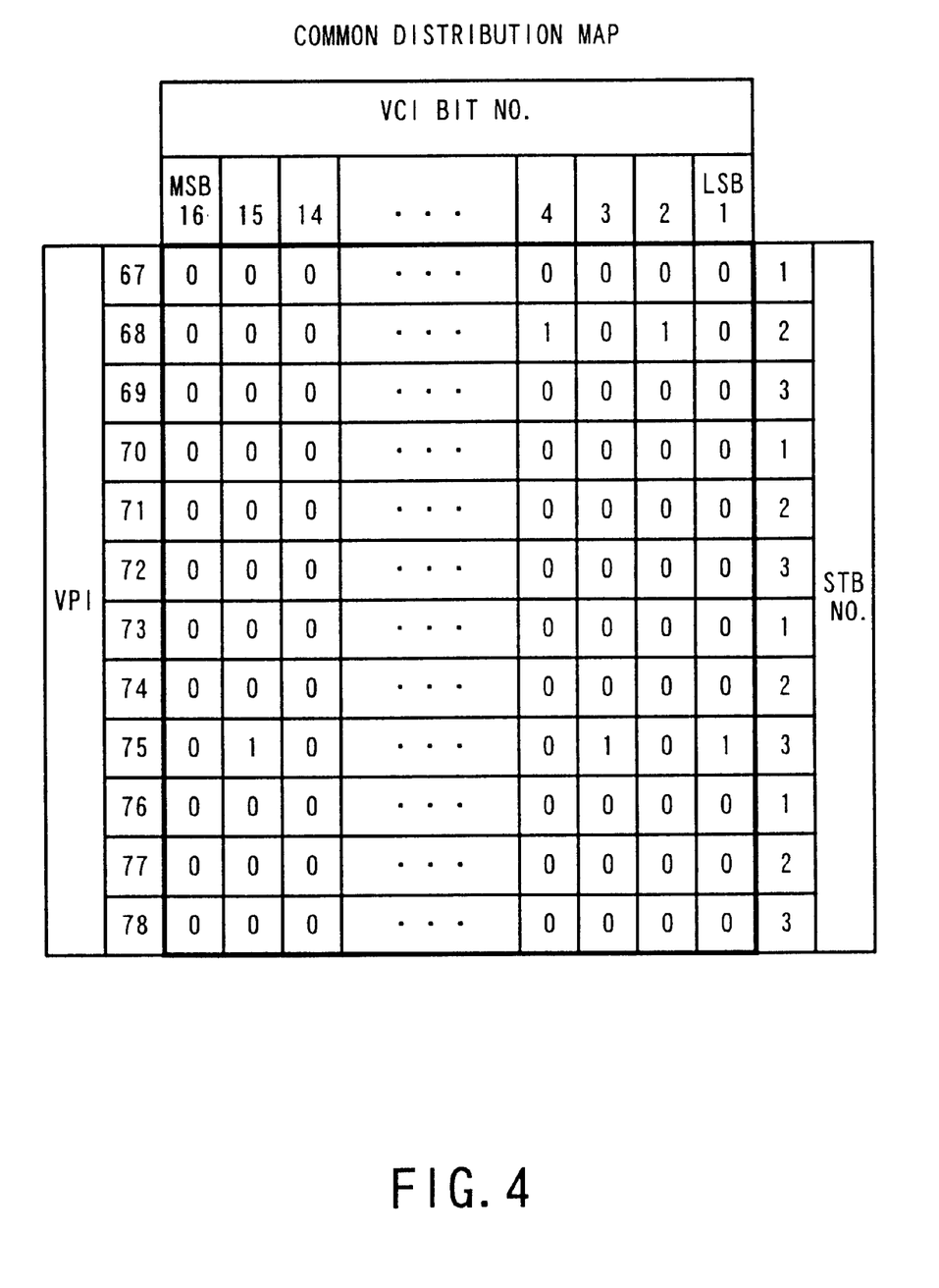
FIG. 4 is a chart showing a common distribution map.

FIG. 4 is a chart showing the common distribution map. The common distribution map is provided in the distribution control section 20 and is used when the distribution control section 20 transmits common distribution information to the information distributing section 30 by using a single communication path.

The common distribution map is similar in arrangement to the common distribution correspondence list shown in FIG. 3 but the figures inside the thick-line rectangle differ from those of the counterpart. At the time of initialization, the value "0" is set for all the entries within the thick-line rectangle of the common distribution map, and when the distribution control section 20 is to transmit a common program via a single communication path, the value "1" is set in the required positions.

A program distribution process executed by the distribution control section 20 and the information distributing section 30 will be now described.

Figure 5:
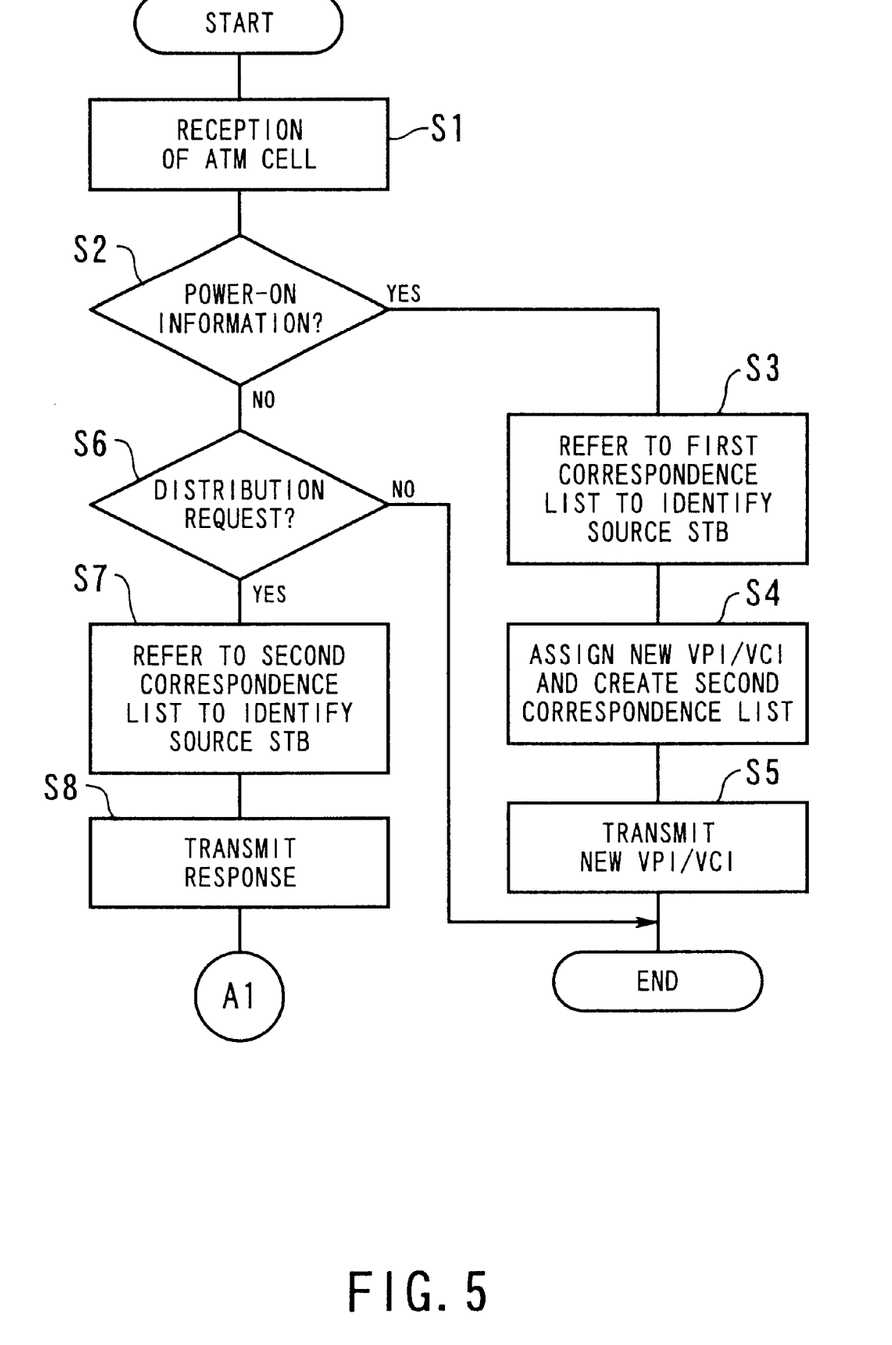
FIG. 5 is a flowchart showing the former half of a process from the acceptance of a distribution request to the transmission of distribution information to an information distributing section, executed in a distribution control section.
Figure 6:
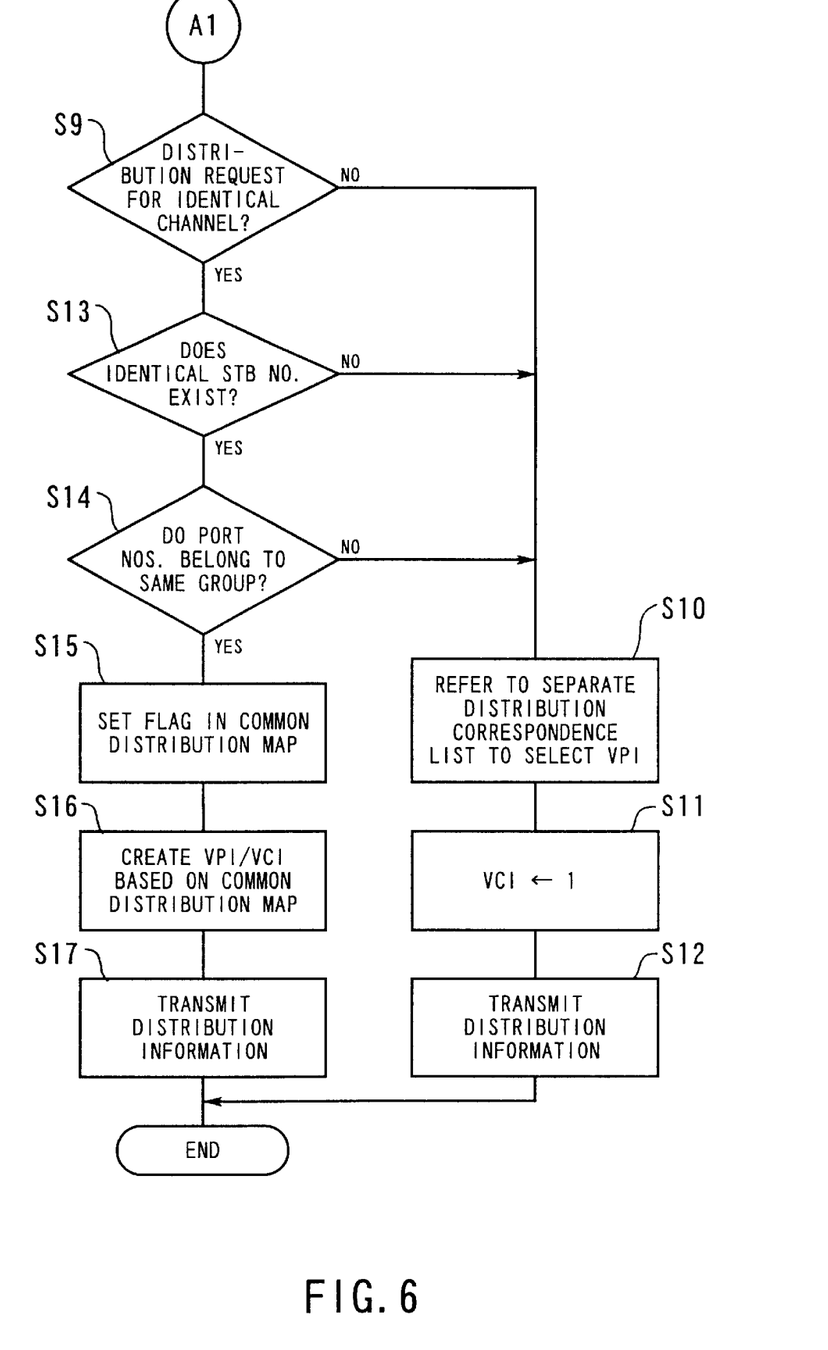
FIG. 6 is a flowchart showing the latter half of the process from the acceptance of a distribution request to the transmission of distribution information to the information distributing section, executed in the distribution control section.

FIGS. 5 and 6 are flowcharts illustrating a process from the acceptance of a distribution request to the transmission of distribution information to the information distributing section 30, executed in the distribution control section 20; wherein FIG. 5 shows the former half of the process and FIG. 6 shows the latter half of same. In the following explanation of the process, reference will be made to step numbers (S) shown in FIGS. 5 and 6.

The STBs 41–43, . . . , 61–63 are respectively assigned unique VPIs/VCIs when the system is put into operation. The distribution control section 20 retains a first correspondence list showing the correspondence of the STBs to the VPIs/VCIs assigned thereto. The VPIs assigned in this case are different from the VPI values "67" to "258" shown in FIG. 2.

Each STB, when power supply thereto is switched on, transmits power-on information to the distribution control section 20 with the use of the communication path having the identification number VPI/VCI assigned thereto.

On receiving an ATM cell from one of the STBs (S1), the distribution control section 20 determines whether or not the information carried by the payload of this ATM cell is power-on information (S2). If the received information is power-on information, the distribution control section 20 checks the identification number VPI/VCI of the communication path which was used for the transmission of this ATM cell, and refers to the first correspondence list to identify the source STB that transmitted the ATM cell (S3).

The distribution control section 20 assigns a new VPI/VCI to the source STB and creates and retains a second correspondence list showing new correspondence of the STBs to VPIs/VCIs (S4). In the second correspondence list, any STB can be identified by the port number and the STB number. The VPIs assigned in this case also differ from the VPI values "67" to "258" shown in FIG. 2. The source STB is then notified of the newly assigned VPI/VCI (S5).

If, after the start of power supply, a request for distribution of a desired program is received from the subscriber with a channel number specified, the STB creates an ATM cell having information indicative of the desired channel number and the distribution request described in its payload, and transmits the cell to the distribution control section 20 by using the VPI/VCI newly assigned and notified.

On receiving an ATM cell from one of the STBs (S1), the distribution control section 20 determines whether or not the information carried by the payload of this ATM cell is power-on information (S2), and if the information is not power-on information, the control section 20 determines whether or not the information carried by the payload of the ATM cell is distribution request information (S6). If the received information is distribution request information, the distribution control section 20 checks the identification number VPI/VCI of the communication path which was used for the transmission of this ATM cell, and refers to the second correspondence list to identify the source STB that transmitted the ATM cell (S7). Then, the distribution control section 20 transmits a response signal to the source STB to notify same that the ATM cell was received without fail (S8).

The distribution control section 20, which has thus received the distribution request, extracts the channel number described in the payload of the ATM cell, and checks to find if there is a channel number identical with the extracted one among channel numbers which the distribution control section 20 has already been requested to distribute respective programs to the information distributing section 30 (S9). If there is no identical channel number, the distribution control section 20 judges that distribution information should be transmitted using a separate communication path from the distribution control section 20 to the information distributing section 30, and therefore, the distribution control section 20 refers to the separate distribution correspondence list shown in FIG. 2 to select the VPI corresponding to the distribution-requesting STB which was identified in Step S7 (S10). For example, if the distribution-requesting STB is the STB 43 with the port number #1 and the STB number #3, "69" is set as the VPI value.

The VCI value is set to "1" (S11).

Using the communication path having the thus-set VPI/VCI=69/1, the distribution control section 20 transmits the requested distribution information to the information distributing section 30 (S12).

If, on the other hand, it is judged as a result of the determination in Step S9 that there is an identical channel number, the port numbers and STB numbers of the STBs to which the program on the identical channel is being distributed are extracted. It is then determined whether or not the extracted STB numbers include an STB number identical with that of the distribution-requesting STB identified in Step S7 (S13). If there is no identical STB number, the flow proceeds to Step S10. For example, if the STB 42 with the port number #1 and the STB number #2 has requested distribution of the program which is being distributed to the STB 43 with the port number #1 and the STB number #3, the STB numbers are not the same; therefore, the distribution control section 20 transmits the requested program to the information distributing section 30 by using the communication path with VPI/VCI=68/1 (S12). In this case, although the same program is transmitted, transmission of the program is carried out using two communication paths, that is, the communication path with VPI/VCI=69/1 and the communication path with VPI/VCI=68/1.

If it is judged as a result of the determination in Step S13 that there is an identical STB number, it is determined whether or not the port number of the distribution-requesting STB identified in Step S7 belongs to the group to which the port number extracted in Step S13 belongs (S14). The port numbers are divided beforehand into a first group of #1 to #16, a second group of #17 to #32, a third group of #33 to #48, and a fourth group of #49 to #64.

If the port numbers do not belong to the same group, the flow proceeds to Step S10. For example, where the STB 63 with the port number #64 and the STB number #3 has requested distribution of the program which is being distributed to the STB 43 with the port number #1 and the STB number #3, the STB numbers are the same but the port numbers belong to the first and fourth groups, respectively; in this case, the distribution control section 20 transmits the requested program to the information distributing section 30 by using the communication path with VPI/VCI=258/1 (S12). Also in this case, although the same program is transmitted, transmission of the program is performed separately via the communication path with VPI/VCI=69/1 and the communication path with VPI/VCI=258/1.

If, on the other hand, it is judged as a result of the determination in Step S14 that the port numbers belong to the same group, a flag is set in the common distribution map shown in FIG. 4 (S15). Specifically, using the port number and STB number of the distribution-requesting STB identified in Step S7, reference is made to the common distribution correspondence list shown in FIG. 3 to locate a corresponding position in the common distribution map, and the value "1" is set in the corresponding position thus located. Also, using the port number and STB number of the STB extracted in Step S13, to which the identical program is being distributed, reference is made to the common distribution correspondence list shown in FIG. 3 to locate a corresponding position in the common distribution map, and the value "1" is set in the thus-located corresponding position.

As a first example, where the STB with the port number #4 and the STB number #2 has requested distribution of the program which is being distributed to the STB with the port number #2 and the STB number #2, the STB numbers are the same and the port numbers both belong to the first group; therefore, Step S15 is executed. In this case, the STB with the port number #2 and the STB number #2 corresponds to the position of VPI value/VCI bit number=68/2 in FIG. 3, and the STB with the port number #4 and the STB number #2 corresponds to the position of VPI value/VCI bit number=68/4 in the same figure. FIG. 4 illustrates the case where the value "1" is set in each of these positions.

As a second example, where the STB with the port number #47 and the STB number #3 has requested distribution of the program which is being distributed to the STB with the port number #33 and the STB number #3 as well as to the STB with the port number #35 and the STB number #3, the STB numbers are the same and also the port numbers belong to the third group; therefore, Step S15 is executed. In this case, the STB with the port number #33 and the STB number #3 corresponds to the position of VPI value/VCI bit number=75/1 in FIG. 3, the STB with the port number #35 and the STB number #3 corresponds to the position of VPI value/VCI bit number=75/3 in the same figure, and the STB with the port number #47 and the STB number #3 corresponds to the position of VPI value/VCI bit number=75/15 in the same figure. FIG. 4 illustrates the case where the value "1" is set in each of these positions.

Then, based on the common distribution map in which the flag has been set in this manner, a VPI/VCI is created (S16). Specifically, in the common distribution map, a row in which the flag has newly been set (the value "1" has newly been set) is extracted, the VPI value corresponding to the extracted row is read out, and taking the values "0" and "1" in the row as respective digits of a binary number, a VCI value is obtained by converting the binary number into a decimal number. In the above first example, VPI/VCI=68/10 ($10=2^1+2^3$), and in the second example, VPI/VCI=75/16389 ($16389=2^0+2^2+2^{14}$).

Using the communication path having the thus-created VPI/VCI, the distribution control section 20 transmits the distribution information on the same channel to the information distributing section 30 (S17). When the transmission of the distribution information on the same channel is initiated in this manner with the use of the communication path having the newly created VPI/VCI, the transmission of the distribution information via the other communication path carried out until then is stopped. In the first example stated above, the distribution control section 20 initiates transmission of distribution information on, for example, the channel x, via the communication path with the new VPI/VCI=68/10, and at the same time stops the transmission of the distribution information on the channel x via the communication path with VPI/VCI=71/1 carried out until then.

Figure 7:
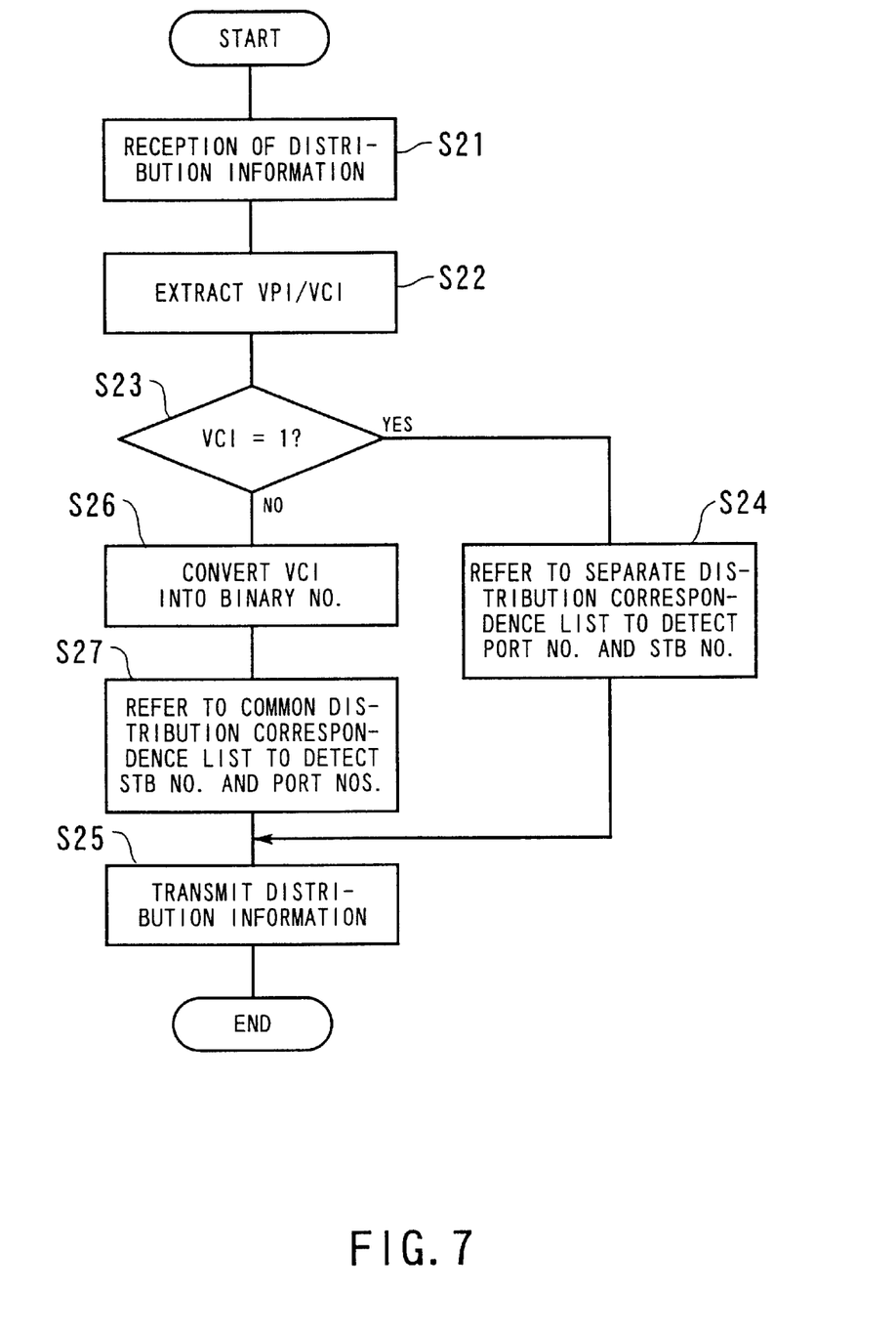
FIG. 7 is a flowchart showing a process for distribution of distribution information to STBs, executed in the information distributing section upon receipt of the distribution information from the distribution control section.

FIG. 7 is a flowchart showing a process for distribution of distribution information to STBs, executed in the information distributing section 30 upon receipt of distribution information from the distribution control section 20. In the following explanation of the process, reference will be made to step numbers (S) shown in FIG. 7.

On receiving distribution information from the distribution control section 20 (S21), the information distributing section 30 extracts the identification number VPI/VCI of the communication path via which this distribution information has been transmitted (S22). A determination is then made as to whether or not the VCI value (expressed in decimal number) in the extracted identification number equals the value "1" (S23), and if the VCI value equals the value "1", reference is made to the separate distribution correspondence list shown in FIG. 2 to detect a port number and an STB number corresponding to the VPI value in the extracted identification number (S24). For example, where the extracted identification number of the communication path is VPI/VCI=69/1, Step S24 is executed and the port number #1 and the STB number #3 are detected. The STB thus detected is exactly the STB 43 explained above with reference to Step S10 as the STB to which the distribution control section 20 should distribute the distribution information.

The information distributing section 30 transmits the distribution information sent from the distribution control section 20 to the STB having the detected port and STB numbers (S25).

If, on the other hand, it is judged in Step S23 that the VCI value is not equal to the value "1", the VCI value is converted into a binary number (S26). Then, reference is made to the common distribution correspondence list shown in FIG. 3 to detect an STB number and a plurality of port numbers which correspond to the VCI value expressed in binary number and to the VPI value in the extracted identification number (S27).

For example, where the extracted identification number of the communication path is VPI/VCI=68/10 (first example stated above), the VCI value "10", when expressed in binary number, has the value "1" in the second and fourth digits. Reference is then made to the common distribution correspondence list shown in FIG. 3, whereupon the STB number #2 corresponding to the VPI value "68" and the port numbers #2 and #4 in the same row respectively corresponding to the second and fourth digits of the VCI value are detected. Consequently, the STB with the port number #2 and the STB number #2 and the STB with the port number #4 and the STB number #2 are detected. The two STBs thus detected are exactly the two STBs explained above with reference to the first example as the STBs to which the distribution control section 20 should distribute the identical distribution information.

For example, where the extracted identification number of the communication path is VPI/VCI=75/16389 (second example stated above), the VCI value "16389", when expressed in binary number, has the value "1" in the first, third and fifteenth digits. Reference is then made to the common distribution correspondence list shown in FIG. 3, whereupon the STB number #3 corresponding to the VPI value "75", and the port numbers #33, #35 and #47 in the same row respectively corresponding to the first, third and fifteenth digits of the VCI value are detected. Consequently, the STB with the port number #33 and the STB number #3, the STB with the port number #35 and the STB number #3, and the STB with the port number #47 and the STB number #3 are detected. The three STBs thus detected are exactly the three STBs explained above with reference to the second example as the STBs to which the distribution control section 20 should distribute the identical distribution information.

The information distributing section 30 transmits the identical distribution information, sent from the distribution control section 20, to the STBs having the detected port and STB numbers (S25).

Thus, according to this embodiment of the present invention, an identical program directed to a plurality of STBs can be, except for particular cases, transmitted with the use of a single communication path between the distribution control section 20 and the information distributing section 30. Nevertheless, the distribution control section 20 requires no extra traffic to send the information distributing section 30 information indicative of STBs to which identical distribution information is to be distributed, and the information distributing section 30 identifies the individual STBs to which the identical distribution information is to be distributed, from the identification number of the communication path via which the identical distribution information has been transmitted. Consequently, the traffic between the distribution control section 20 and the information distributing section 30 does not increase, and also no delay occurs in the program distribution.

Although in the above embodiment, the VCI value is converted into a decimal number in Step S16 and is thereafter again converted into a binary number in Step S26, the VCI value may remain as a binary number during the process between these steps.

Also, in the foregoing embodiment, the first and second correspondence lists are additionally provided, but neither the first nor the second correspondence list may be provided and the separate distribution correspondence list shown in FIG. 2 may be used for the purpose instead.

Further, although the above embodiment uses a single information distributing section 30, a plurality of (e.g., three) information distributing sections may be connected to the distribution control section 20. Also in this case, a large number of STBs are connected to each information distributing section, like the information distributing section 30 shown in FIG. 1.

As described above, according to the present invention, the distribution control section specifies set-top boxes to which distribution information is to be distributed, by identification numbers of communication paths. In addition, a plurality of set-top boxes can be specified by a single identification number. Accordingly, on receiving distribution information from the distribution control section, the information distributing section can transmit the distribution information to set-top boxes by merely checking the identification numbers of the communication paths via which the distribution information has been transmitted, and also can distribute identical distribution information to the individual set-top boxes as specified.

Thus, according to the present invention, an identical program directed to a plurality of set-top boxes can be transmitted with the use of a single communication path between the distribution control section and the information distributing section.

Nevertheless, the distribution control section requires no extra traffic to send the information distributing section information indicative of set-top boxes to which identical distribution information is to be distributed, and the information distributing section identifies the individual set-top boxes to which the identical distribution information is to be distributed, from the identification number of the communication path via which the identical distribution information has been transmitted. Consequently, the traffic between the distribution control section and the information distributing section does not increase, and also no delay occurs in the program distribution.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. An information distribution apparatus for a CATV system provided with an information distributing section to which a plurality of set-top boxes are connected, and a distribution control section situated between the information distributing section and a head-end section, comprising:

path identification number decision means provided in the distribution control section, for determining an identification number of a single communication path for a plurality of set-top boxes when distribution of identical information is requested from said plurality of set-top boxes;

distribution information transmitting means provided in the distribution control section, for transmitting the requested distribution information to the information distributing section via the communication path with the identification number determined by said path identification number decision means;

set-top box identifying means provided in the information distributing section, for identifying individual set-top boxes to which the distribution information is to be distributed, based on the identification number of the communication path used for transmission by said distribution information transmitting means when the distribution information is received from said distribution information transmitting means; and distribution information distributing means provided in the information distributing section, for distributing the distribution information to each of the set-top boxes identified by said set-top box identifying means, wherein an identical program directed to a plurality of set-top boxes can be transmitted using the single communication path, identified by the identification number, between the distribution control section and the information distributing section, and wherein said path identification number decision means includes a common distribution map having fields respectively associated with all set-top boxes connected to the information distributing section, flag setting means for setting a value of 1 in those fields of said common distribution map which correspond to said plurality of set-top boxes that requested distribution of identical information, and path identification number creating means for relating each field of said common distribution map in which said flag setting means has set a flag, with each digit of a binary number, to thereby create part of the identification number of the communication path.

2. The information distribution apparatus according to claim 1, wherein said set-top box identifying means includes a correspondence list showing correspondence between all set-top boxes connected to the information distributing section and respective digits acquired when the part of the identification number of the communication path is expressed in binary number, binary number expressing means for expressing, in binary number, the part of the identification number of the communication path used for transmission by said distribution information transmitting means, and identifying means for extracting digits with a value of 1 in the number expressed by said binary number expressing means, and referring to said correspondence list to identify set-top boxes corresponding to the extracted digits.

3. The information distribution apparatus according to claim 1, further comprising:

separate path identification number decision means provided in the distribution control section, for determining identification numbers of communication paths for respective set-top boxes when distribution of different kinds of information is requested from said respective set-top boxes;

separate distribution information transmitting means provided in the distribution control section, for transmitting the requested different kinds of information to the information distributing section via the communication paths with the respective identification numbers determined by said separate path identification number decision means;

separate set-top box identifying means provided in the information distributing section, for identifying individual set-top boxes to which the respective different kinds of distribution information are to be distributed, based on the identification numbers of the respective communication paths used for transmission by said separate distribution information transmitting means when the different kinds of distribution information are received from said separate distribution information transmitting means; and separate distribution information distributing means provided in the information distributing section, for distributing the different kinds of distribution information to the respective set-top boxes identified by said separate set-top box identifying means.

4. The information distribution apparatus according to claim 1, wherein said distribution control section comprises a BTS (Broadband Tributary Shelf) and said information distributing section comprises a BAS (Broadband Access Shelf).

5. The information distribution apparatus according to claim 1, wherein said single communications path is identified by a single VPI/VCI (Virtual Path Identifier/Virtual Channel Identifier) and the single VPI/VCI identifies the individual set-top boxes to which the distribution information is to be distributed.

* * * * *